United States Patent [19]
Fujimura

[11] Patent Number: 6,147,435
[45] Date of Patent: Nov. 14, 2000

[54] MECHANISM FOR DRIVING A SCREW ROD BY SUPERSONIC VIBRATION

[75] Inventor: Katsuyuki Fujimura, Tokyo, Japan

[73] Assignee: Central Gikenkogyo Corporation, Tokyo, Japan

[21] Appl. No.: 09/267,611

[22] Filed: Mar. 15, 1999

[30] Foreign Application Priority Data

May 22, 1998 [JP] Japan .................................. 10-140655

[51] Int. Cl.$^7$ ................................ H02N 2/04; H02N 2/06
[52] U.S. Cl. .......................... 310/317; 310/311; 310/328
[58] Field of Search ..................................... 310/328, 311, 310/317

[56] References Cited

U.S. PATENT DOCUMENTS

| | | | |
|---|---|---|---|
| 4,438,364 | 3/1984 | Morison | 310/328 |
| 4,578,607 | 3/1986 | Tojo et al. | 310/328 |
| 4,783,610 | 11/1988 | Asano | 310/328 |

FOREIGN PATENT DOCUMENTS

| | | | |
|---|---|---|---|
| 0 959 268 | 11/1999 | European Pat. Off. | F16H 25/20 |
| 5-168258 | 11/1999 | Japan | H02N 2/00 |

*Primary Examiner*—Nestor Ramirez
*Assistant Examiner*—Luis R. Gonzalez
*Attorney, Agent, or Firm*—Wenderoth, Lind & Ponack, L.L.P.

[57] ABSTRACT

In order to provide a mechanism for driving a screw rod by supersonic vibrations, which may achieve space savings, prevent back-lash of a work rack, and effect smooth operation, a first screw rod rotation device is provided for rotation of a screw rod in a first direction, and a second screw rod rotation device is provided for rotation of the screw rod in a second direction. The first screw rod rotation device includes a first vibrator contacting a groove portion of the screw rod at a specific angle, a first spring urging the first vibrator toward the groove portion of a screw rod at a specific pressure and a first piezoelectric actuator for vibrating the first vibrator upon electrical activation. The second screw rod rotation device includes a second vibrator contacting a groove portion of the screw rod at a specific angle opposite that for rotation in the first direction, a second spring urging the second vibrator toward the groove portion of the screw rod at a specific pressure and a second piezoelectric actuator for vibrating the second vibrator upon electrical activation. The first and second screw rod rotation devices are directly mounted on the work rack which surrounds the screw rod and is slidable in the axial direction of the screw rod.

8 Claims, 7 Drawing Sheets

MECHANISM FOR DRIVING A SCREW ROD BY SUPERSONIC VIBRATION

BACKGROUND

This invention relates to a mechanism for driving a screw rod to move a work rack in an axial direction of the screw rod by making the screw rod rotate.

First, FIG. 8 shows a prior art supersonic motor comprising a rotor R and two vibrators S1 and S2. The vibrator S1 is made to vibrate so that the rotor R is pushed by the vibrator S1 to rotate in a clockwise direction in the figure. The vibrator S2 is made to vibrate so that the rotor R is pushed by the vibrator S2 to rotate in a counterclockwise direction in the figure.

Secondly, FIG. 9 shows a prior art mechanism for driving a screw rod by using a motor to rotate a helical rod.

The mechanism shown in FIG. 9 is constituted of a pair of stands 23, a helical rod 22 rotatably held between the pair of the stands 23 via bearings 24, a nut 25 movable in an axial direction of the helical rod 22 upon rotation of the helical rod 22, and a servo-motor 28 connected with the helical rod 22 via a coupling 27 for rotating the helical rod 22.

The helical rod 22 is provided with a helical groove 29 formed thereabout along the axial direction thereof, and balls 26 enclosed in the nut 25 are engaged in the groove 29 to hold the nut 25 on the helical rod 22. Thus, the servo-motor 28 makes the helical rod 22 rotate forward or in reverse so that the nut 25 may be moved in the axial direction of the helical rod.

A workpiece moved upon movement of the nut 25 is slidably held by rails, a slider or the like (not shown in FIG. 9), so that the load of the workpiece is not moved in a radial direction of the helical rod 22.

However, the above-mentioned mechanism for driving a helical rod has the following problems: troubles by back-lash occurs by a minimum space necessary in an engaged portion between the helical rod 22 and balls 26; space-savings may not be achieved because the balls, the nut, the servo-motor, and so on require sufficient space to rotate smoothly; back-lash is increased due to the increase of abrasion between the nut, the balls and the helical rod after a long period of use; and friction between the nut, the balls and the helical rod is increased by minimizing the space between them in order to decrease the back-lash in the mechanism.

Note that the helical rod is the same shape as a screw rod of the present invention, but the helical rod is used with the balls and the nut. In this point, the helical rod is distinguished from the screw rod of the present invention.

SUMMARY OF THE INVENTION

An object of the invention is to provide a mechanism for driving a screw rod by supersonic vibration and which can resolve the above mentioned problems.

According to one embodiment of the invention, there is provided a mechanism for driving a screw rod by supersonic vibration, comprising: a screw rod provided with a groove portion formed helically along an axial direction thereof; a pair of stands for rotatably receiving the screw rod by rotatably holding both ends of the screw rod; a work rack provided to surround the screw rod and which is slidable in the axial direction of the screw rod; at least one first screw rod rotation device secured on one side of the work rack and extending from the work rack to the screw rod. The first screw rod rotation device comprises a first vibrator contacting with the groove portion of the screw rod at a specific angle, a first spring urging the first vibrator toward the groove portion of the screw rod at a specific pressure and a first piezoelectric actuator for vibrating the first vibrator upon electrical activation to rotate the screw rod in a first direction; at least one second screw rod rotation device secured on another side of the work rack and extending from the work rack to the screw rod. The second screw rod rotation device comprises a second vibrator contacting with the groove portion of the screw rod at a specific angle opposite that for rotation in the first direction, a second spring urging the second vibrator toward the groove portion of the screw rod at a specific pressure and a second piezoelectric actuator for vibrating the second vibrator electrical activation to rotate the screw rod in a second direction. Note that the work rack is used for moving a workpiece, but that there are cases in which the workpiece is placed on the work rack directly as well as cases in which the work rack is connected to another rack on which a workpiece is placed.

According to this invention, therefore, the first screw rod rotation device comprising the first vibrator contacting with the groove portion of the screw rod at the specific angle, the first spring urging the first vibrator toward the groove portion of the screw rod at the specific pressure and the first piezoelectric actuator for vibrating the first vibrator upon electrical activation to rotate the screw rod in one direction and the second screw rod rotation device comprising the second vibrator contacting with the groove portion of the screw rod at a specific angle opposite that for rotation in the first direction, the second spring urging the second vibrator to the groove portion of the screw rod at the specific pressure and the second piezoelectric actuator vibrating the second vibrator upon electrical activation to rotate the screw rod in a second direction, are directly mounted on the work rack surrounding the screw rod and slidable in the axial direction of the screw rod to achieve space savings. Back-lash may be prevented by urging the vibrators toward the groove portion with the spring and back-lash due to abrasion by use over a long period of time also may be prevented.

Furthermore, in the present invention, when one of the first and the second piezoelectric actuators is electrically activated, a very small amount of electric current is supplied to the other of the first and the second piezoelectric actuators. Thus, upon rotation of the screw rod, friction of vibrators which do not contribute to the rotation of the screw rod may be decreased.

Moreover, the first and second vibrators are each wedge-shaped and has a front end slant along a circumference of a bottom of the groove of the screw rod.

The work rack is slidably held on rails extending parallel to an axis of the screw rod.

BRIEF DESCRIPTION OF THE DRAWINGS

Further objects and advantages of the invention can be more fully understood from the following detailed description taken in conjunction with the accompanying drawings in which.

DESCRIPTION OF THE PREFERRED EMBODIMENT

Figure 1:
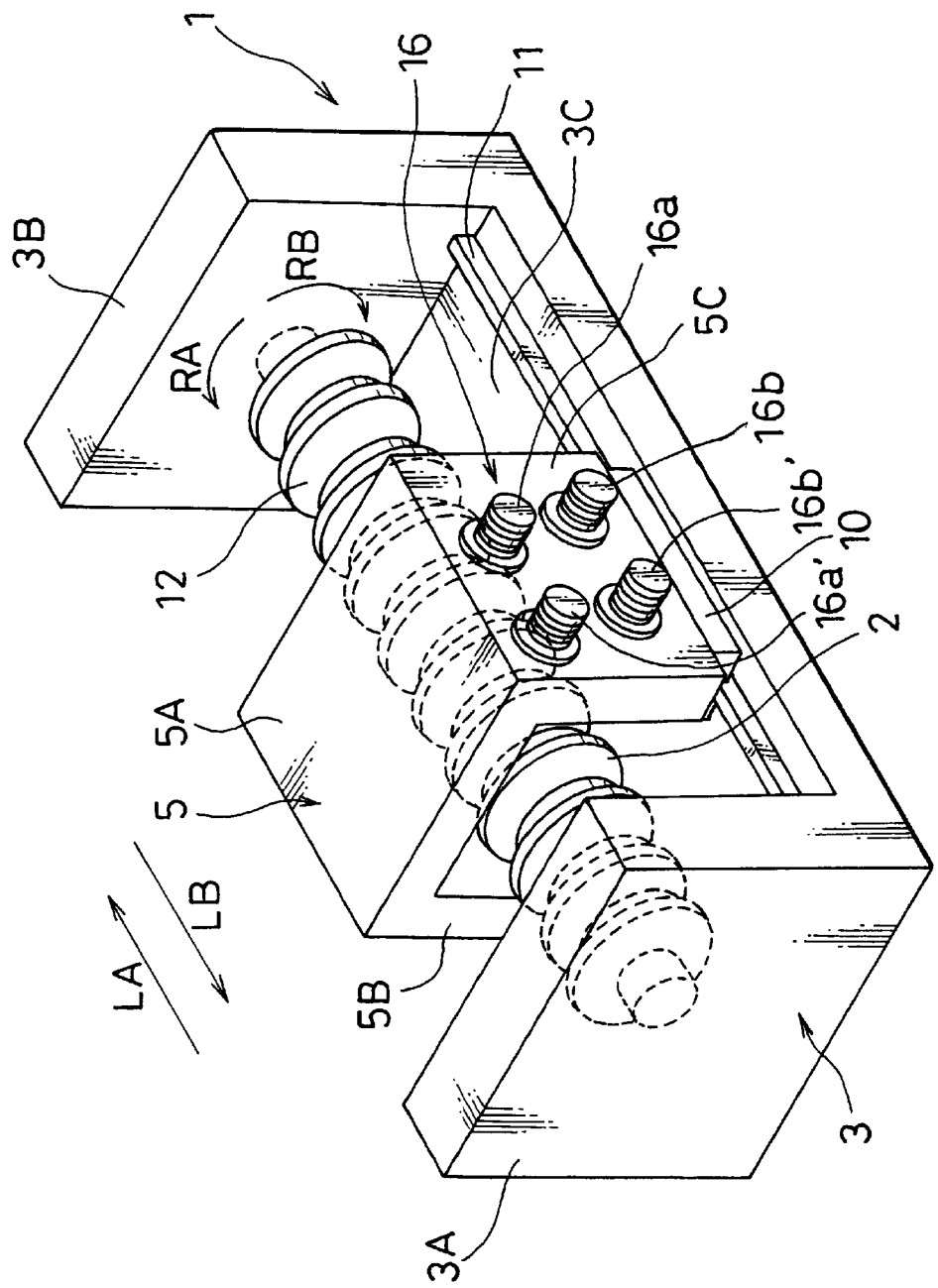
FIG. 1 is an outline perspective view illustrating a mechanism for driving a screw rod by supersonic vibration according to the present invention.
Figure 2:
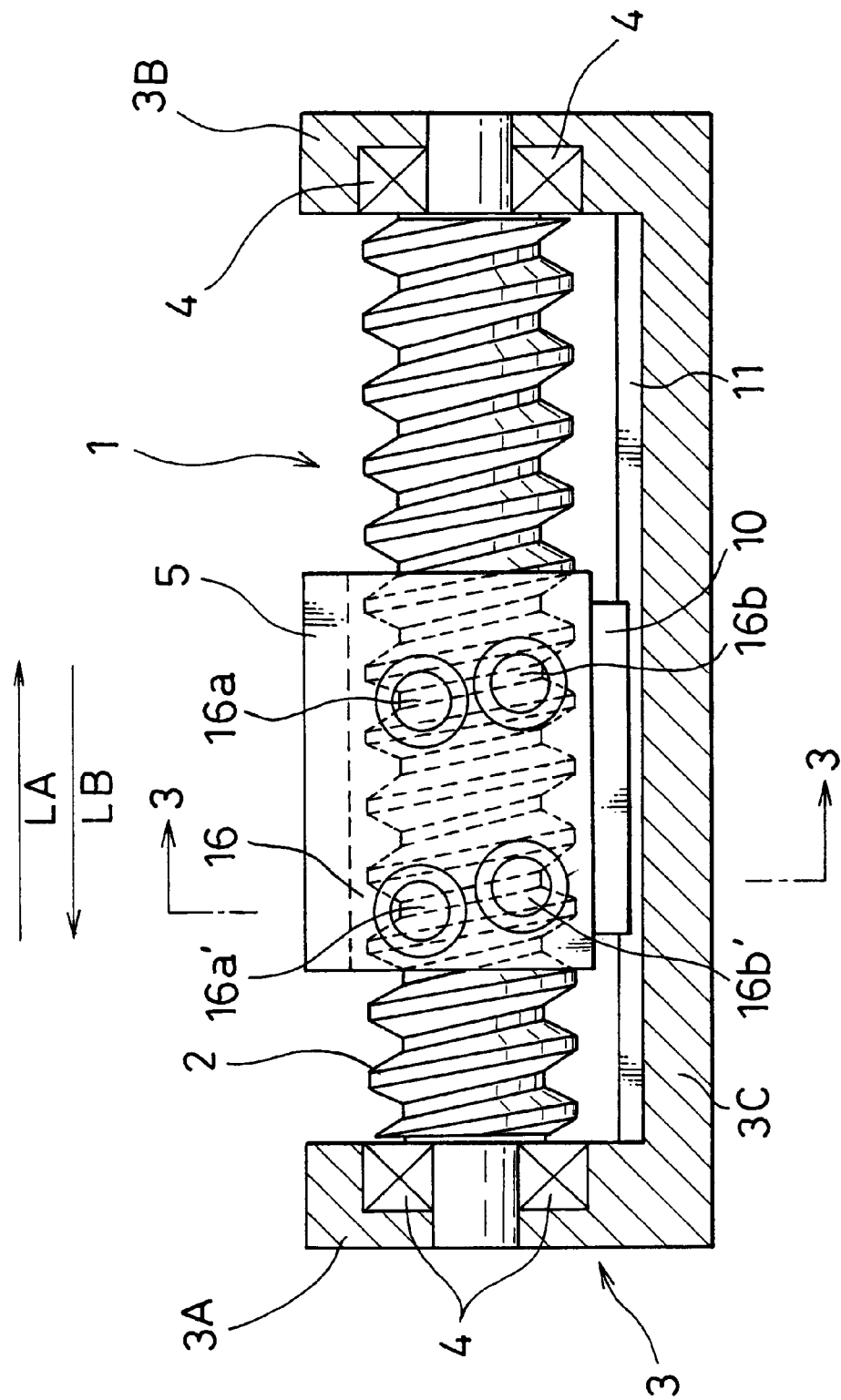
FIG. 2 is a side elevation view of the mechanism by a supersonic vibration illustrated in FIG. 1.

Hereinafter, a preferred embodiment of the present invention will be explained with reference to the drawings.

A mechanism 7 for driving a screw rod by supersonic vibration according to the preferred embodiment of this invention comprises, as shown in FIGS. 1 through 5, a screw rod 2 provided with a groove portion 12 formed helically along an axial direction thereof, a stand 3 for rotatably holding the screw rod 2. The stand 3 includes a pair of side walls 3A, 3B for rotatably holding both ends of the screw rod 2, and a bottom plate portion 3C connected between the side walls 3A, 3B. A work rack 5 is slidable axially along the screw rod 2, and a plurality of screw rod rotation devices 16 slidably mount the work rack 5 to the screw rod 2.

In this embodiment, the work rack 5 is provided with a pair of side wall portions 5B, 5C located on opposite sides of the screw rod, and a workpiece setting portion 5A bridging between upper ends of the side wall portions 5B, 5C. Sliders 10 are provided on lower ends of the work rack 5 so that the work rack 5 is held slidably on a pair of rails 11 laid on the bottom plate portion 3C of the stand 3.

Figure 6A:
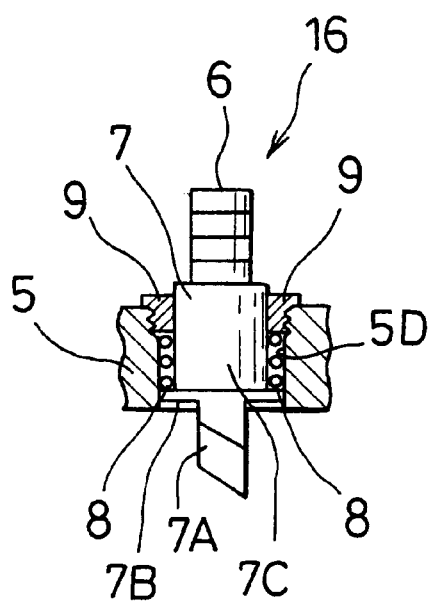
FIG. 6A is a side elevation view illustrating a screw rod rotation device.
Figure 6B:
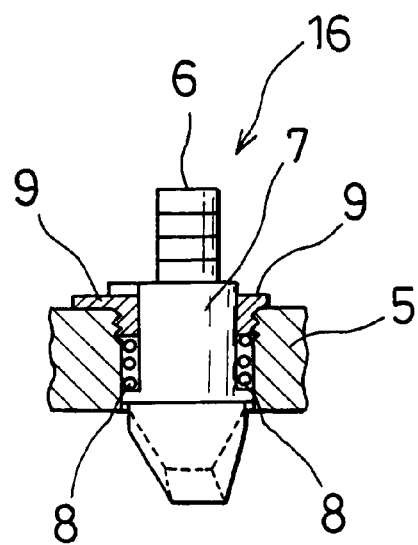
FIG. 6B is a front elevation view of the screw rod rotation device.

Each of the screw rod rotation devices 16 is, as shown in FIG. 6, constituted of a vibrator 7, a spring 8, a spring fastening plate 9 and a piezoelectric actuator 6. Each vibrator 7 comprises a front end portion 7A formed in a wedge-shape for contacting the groove 12 of the screw rod 2 at a specific angle, a main body 7C slidably inserted into a mounting hole 5D formed in one the side walls 5B, 5C of the work rack 5 and a flange portion 7B formed between the front end portion 7A and the main body 7C and holding one end of the spring 8. The spring 8 has one end contacting the flange portion 7B and urges the vibrator 7 into the groove 12 to contact the screw rod 2 at a specific pressure. The spring fastening plate 9 secures a part of the main body 7C of the vibrator 7 to a periphery of the mounting hole 5D and holds another end of the spring 8. The piezoelectric actuator 6 imparts supersonic vibration to the vibrator 7 upon supply of electric power to the actuator 6.

Figure 3:
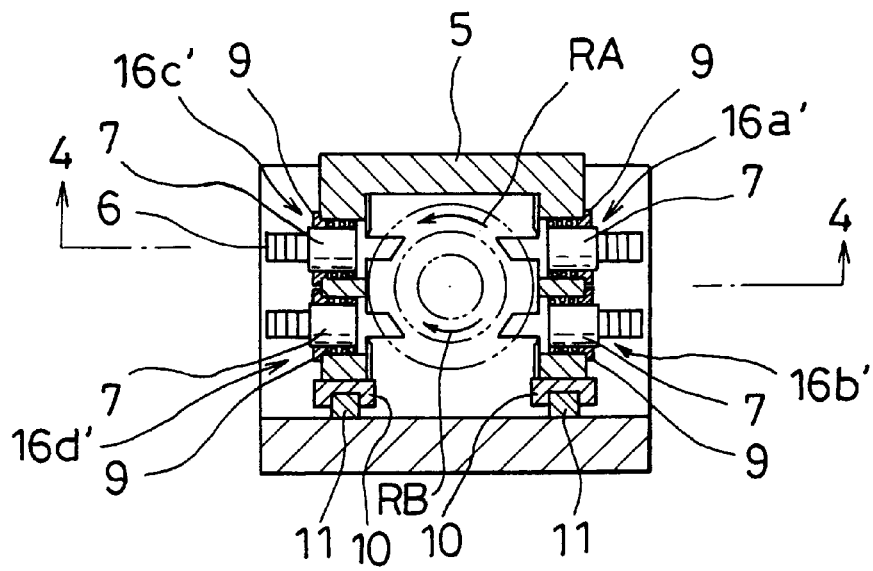
FIG. 3 is a cross section view taken along line 3—3 of FIG. 2.
Figure 4:
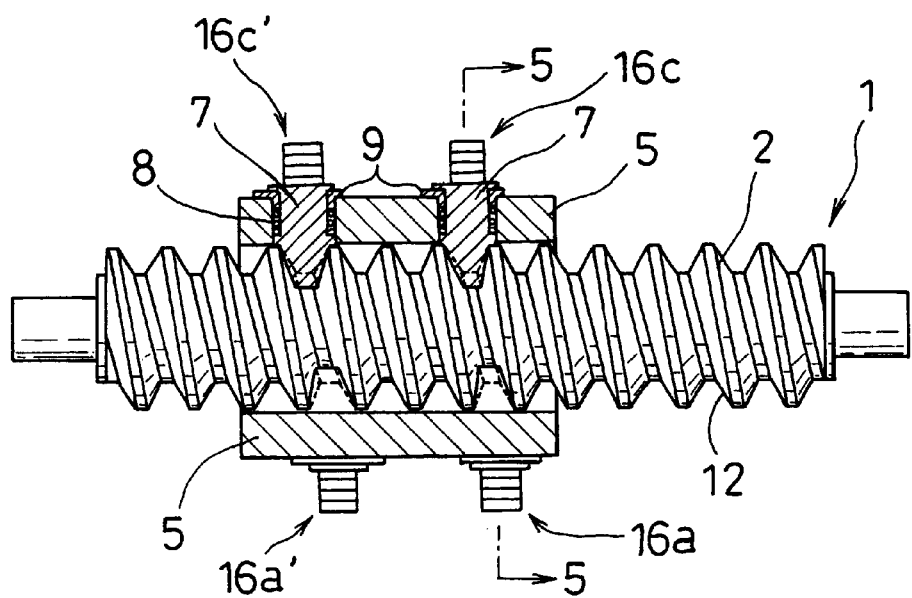
FIG. 4 is a cross section view taken along line 4—4 of FIG. 3.
Figure 5:
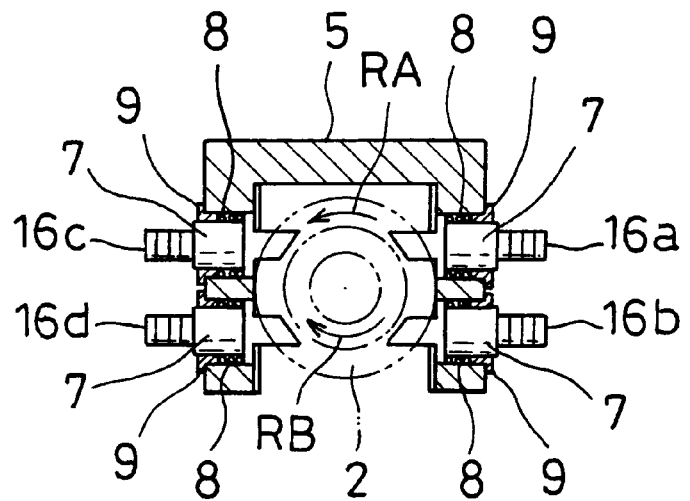
FIG. 5 is a cross section view taken along line 5—5 of FIG. 4.

Furthermore, the screw rod rotation devices 16 include a first screw rod rotation device group 16a, 16a', 16d, 16d' for rotating the screw rod 2 in a direction shown by an arrow RA in FIGS. 1 and 3 (hereinafter, the RA rotational direction) and a second screw rod rotation device group 16b, 16b', 16c, 16c' for rotating the screw rod 2 in a direction shown by an arrow RB (hereinafter, the RB rotational direction).

In each screw rod rotation device 16 of the first screw rod rotation device group 16a, 16a', 16d, 16d', the vibrator 7 extends in a direction which is at an acute angle to the RA rotational direction and at an obtuse angle to the RB rotational direction (see FIG. 3) and is urged into the groove portion 12 of the screw rod with a pressure determined by the spring 8 in an extending direction thereof.

In this condition, when the piezoelectric actuator 6 is energized with electricity, the vibrator 7 vibrates so as to produce a large dynamic vector component in the RA rotational direction by supersonic vibrations of the piezoelectric actuator 6, so that the screw rod 2 is rotated in the RA rotational direction. The work rack 5 thus moves in a direction shown by an arrow LA in FIGS. 1 and 2 (hereinafter, the LA direction) by rotation in the RA rotational direction of the screw rod 2.

In the same way, in each screw rod rotation device 16 of the second screw rod rotation device group 16b, 16b', 16c, 16c', the vibrator 7 extends in a direction which is at an acute angle to the RB rotational direction and at an obtuse angle to the RA rotational direction and is urged into the groove portion 12 of the screw rod with a pressure determined by the spring 8 in an extending direction thereof.

In this condition, when the piezoelectric actuator 6 is energized with electricity, the vibrator 7 vibrates so as to produce a large dynamic vector component in the RB rotational direction by supersonic vibrations of the piezoelectric actuator 6, so that the screw rod 2 is rotated in the RB rotational direction. The work rack 5 thus moves in a direction shown by an arrow LB in FIGS. 1 and 2 (hereinafter, the LB direction) by rotation in the RB rotational direction of the screw rod 2.

Moreover, it is desired that a very small current is supplied to the second screw rod rotation device group 16b, 16b', 16c, 16c' to give a very small vibration to the vibrators 7 of the second screw rod rotation device group 16b, 16b', 16c, 16c' when the first screw rod rotation device group 16a, 16a', 16d, 16d' is operated, and that a very small current is supplied to the first screw rod rotation device group 16a, 16a', 16d, 16d' to give a very small vibration to the vibrators 7 of the first screw rod rotation device group 16a, 16a', 16d, 16d' when the second screw rod rotation device group 16b, 16b', 16c, 16c' is operated.

Because a dynamic vector component tending to move the screw rod 2 in a reverse direction due to the very small vibrations of the vibrators 7 is much smaller than a dynamic vector component for moving the screw rod 2 due to the normal vibrations of the vibrators 7, the dynamic vector component due to the very small vibrations does not influence the rotation of the vibrator 7 caused by the normal vibrations. Furthermore, the very small vibrations effect a decrease in rotational friction resistance of the screw rod 2, and this effect is larger than the effect of the minor reverse rotation caused by the very small vibrations, and thus the screw rod may be rotated more smoothly.

Moreover, in the above mentioned mechanism for driving a screw rod 1, when the electric power is stopped, every vibrator 7 of the first and the second screw rod rotation device groups 16a–16d, 16a'–16d' is pressed into the groove 12 of the screw rod 2 at the specific pressure determined by the spring 8 to hold the work rack 5 at a specific position of the screw rod 2.

Figure 7:
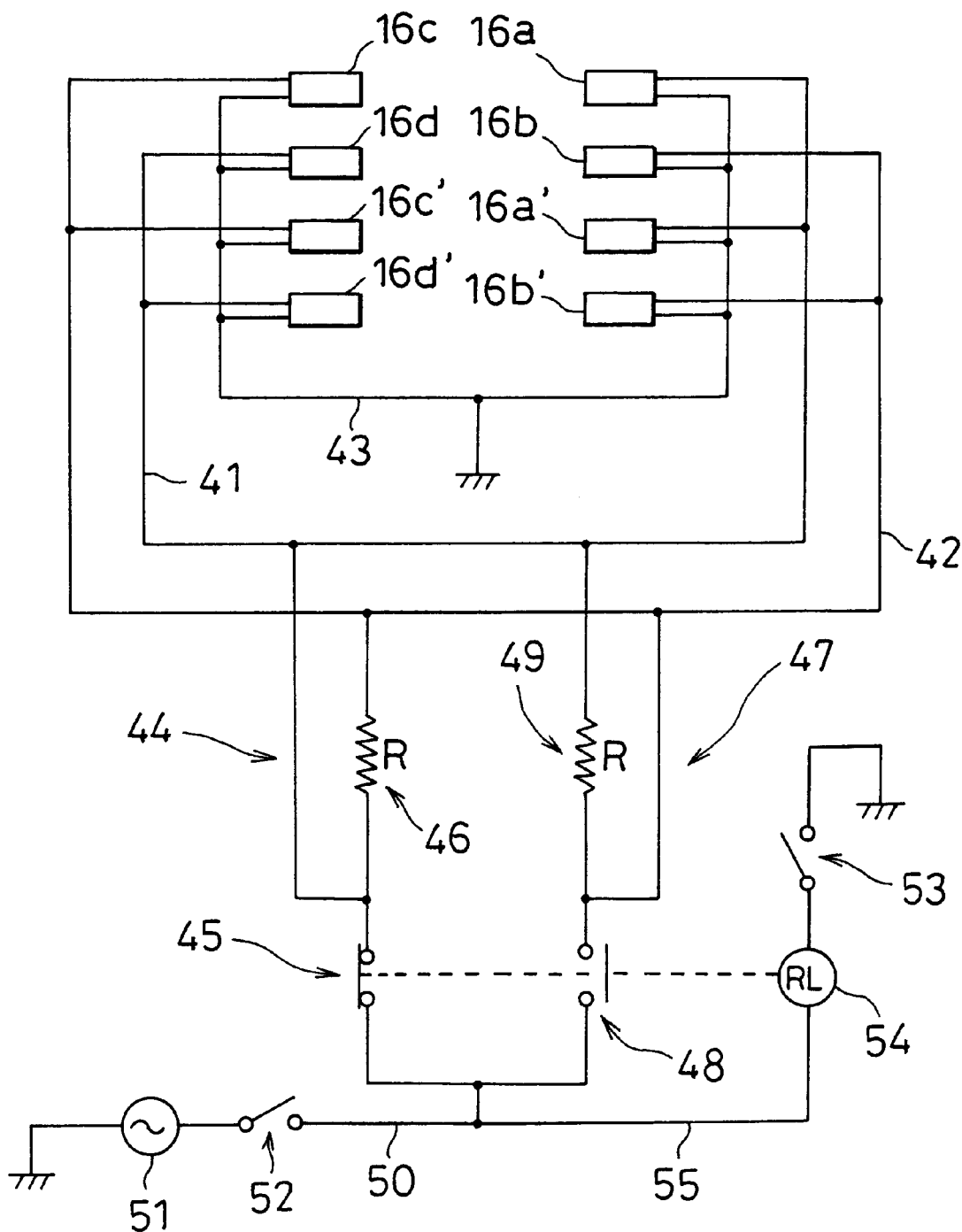
FIG. 7 is an electric circuit diagram showing one example of a driving circuit of the mechanism for driving the screw rod by supersonic vibration.
Figure 8:
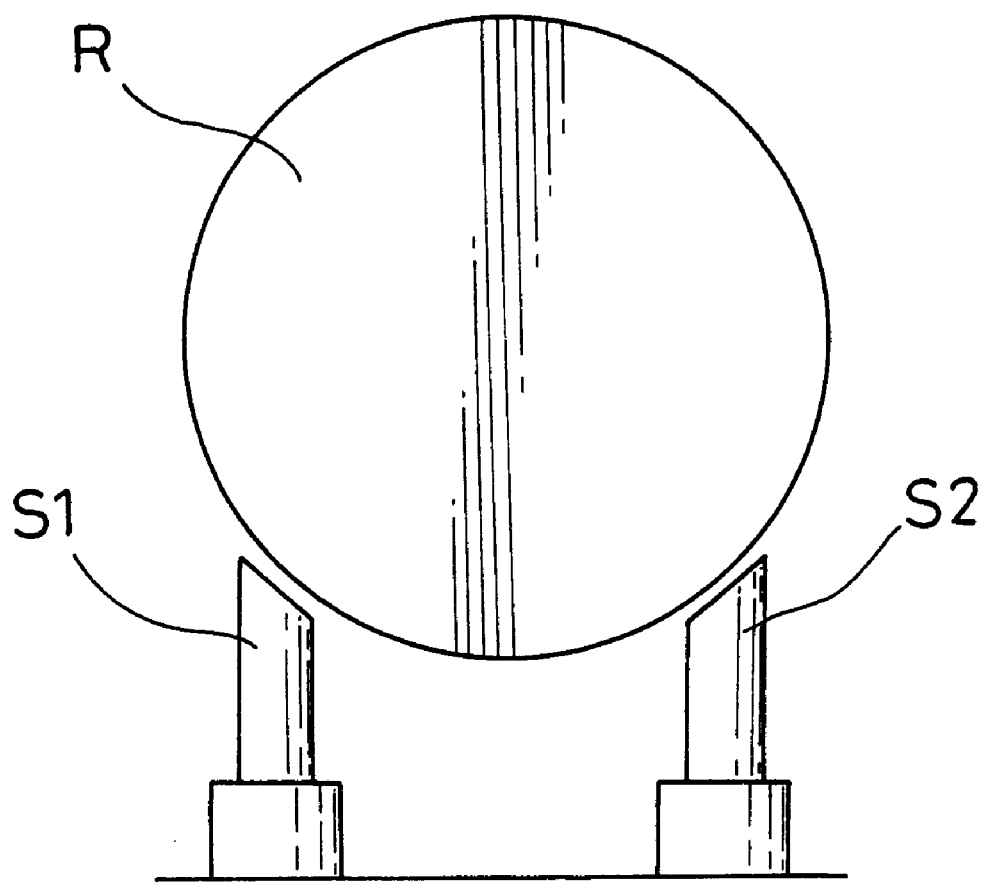
FIG. 8 is an illustration for explaining an operating principle of a prior art supersonic motor.
Figure 9:
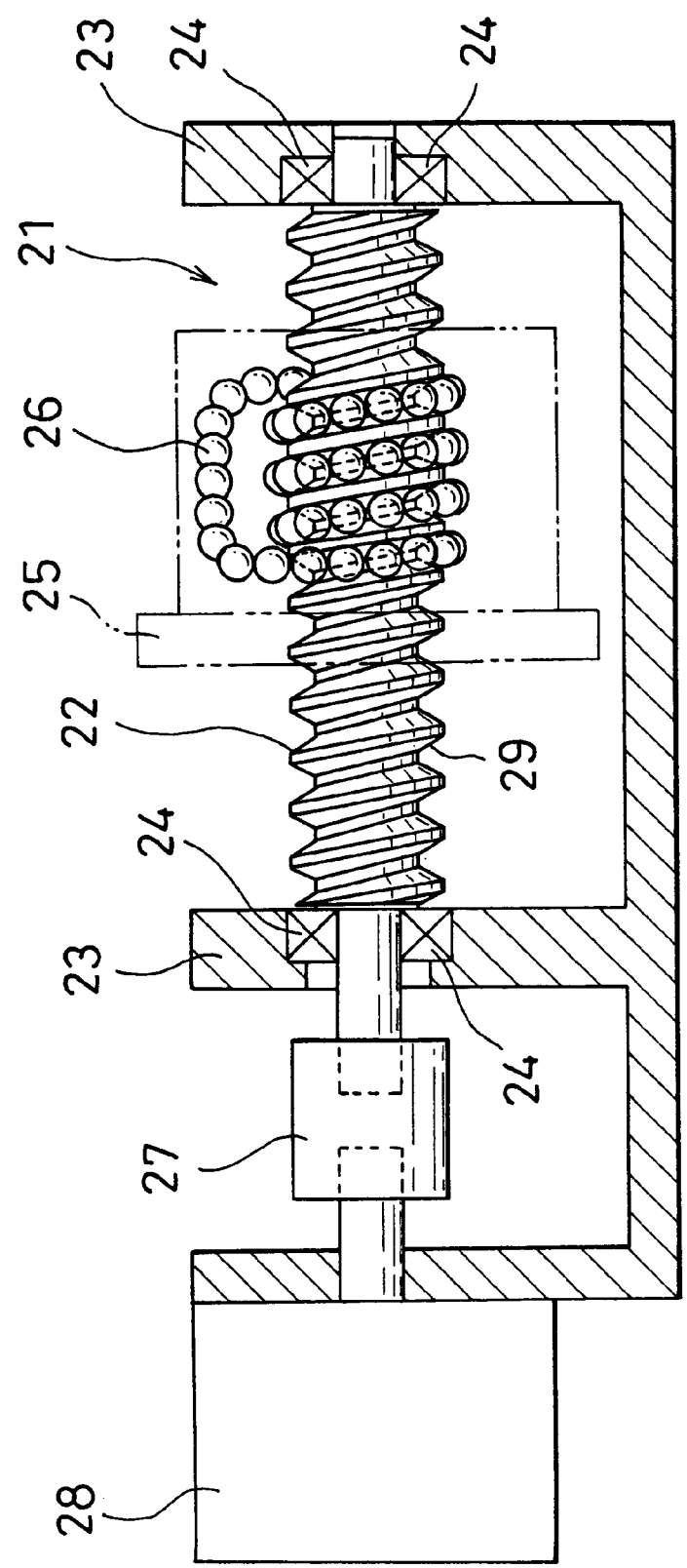
FIG. 9 is a cross section view illustrating a prior art mechanism for driving a helical rod by a motor.

One example of an electric circuit diagram for operating the mechanism 1 is shown in FIG. 7.

In the electric circuit diagram, a first terminal of each of the piezoelectric actuators 6 in the first screw rod rotation device group 16a, 16a', 16d, 16d' is connected to a first electric power supply line 41, a first terminal of each of the piezoelectric actuators 6 in the second screw rod rotation device group 16b, 16b', 16c, 16c' is connected to a second electric power supply line 42, and all second terminals of the piezoelectric actuators 6 are connected to a ground line 43.

A power source line 50 is connected to one terminal of an electric power source 51 via an on/off switch 52 for turning communication to all lines on or off.

An RA rotation line 44 is connected to the power source line 50 via a b-contact switch 45 of a relay 54. In the RA rotation line 44, the b-contact switch 45 and the first electric power supply line 41 are directly connected to each other, and the b-contact switch 45 and the second electric power supply line 42 are connected to each other via a resistance R with a large value.

An RB rotation line 47 is connected to the power source line 50 via an a-contact switch 48 of a relay 54. In the RB rotation line 47, the a-contact switch 48 and the second electric power supply line 42 are directly connected to each other, and the a-contact switch 48 and the first electric power supply line 41 are connected to each other via a resistance R with a large value.

A line 55 for changing a rotational direction is connected between the power source line 50 and the relay 54, and the line 55 is turned on or off by a switch 53 for changing a rotation direction.

Thus, when the switch 52 is turned on and the switch 53 is turned off, a large electric current flows into the first electric power supply line 41 and a very small electric current limited by the resistance R flows into the second electric power supply line 42, so that the vibrators 7 of the first screw rod rotation device group 16a, 16a', 16d, 16d' undergo large vibrations and the vibrators 7 of the second screw rod rotation device group 16b, 16b', 16c, 16c' undergo small vibrations. As a result, the screw rod 2 rotates in the RA rotational direction to move the work rack 5 in the LA direction.

When the switch 52 and the switch 53 are turned on, a large electric current flows into the second electric power supply line 42 and a very small electric current limited by the resistance R flows into the first electric power supply line 41, s that the vibrators 7 of the second screw rod rotation device group 16b, 16b', 16c, 16c' undergo large vibrations and the vibrators 7 of the first screw rod rotation device group 16a, 16a', 16d, 16d' undergo small vibrations. As a result, the screw rod 2 rotates in the RB rotational direction to move the work rack 5 in the LB direction.

Note that in the above mentioned embodiment, the distal end of each of the vibrators 7 is formed in a wedge-shape so as to engage in the groove is 12 of the screw rod 2, but it is possible for the distal end of each vibrator 7 to be formed in a concave shape so as to engage with a mountain portion between valleys of the groove 12.

As mentioned above, according to the invention, the screw rod rotation devices for rotating the screw rod by the supersonic vibrations are directly mounted on the work rack moved upon rotation of the screw rod, so that space savings may be achieved.

The vibrators of the screw rod rotation devices are contacted against the screw rod at the specific pressure, so that back-lash of the work rack is prevented, and further, back-lash by frictional wear over a long period of use is also prevented.

Furthermore, the present invention is such that the screw rod is rotated by supersonic vibrations, so that it is not necessary to supply lubrication oil to the mechanism itself, and therefore, the mechanism is effective for use in the fields of foods, semiconductors, medical instruments and so on, that is to say, fields for which it is undesirable to use lubrication oil.

Although the invention has been described in its preferred form with a certain degree of particularity, it is to be understood that the present disclosure of the preferred form can be changed in the details of construction and different combinations and arrangements of parts may be resorted to without departing from the spirit and the scope of the invention as hereinafter claimed.

What is claimed is:

1. A mechanism for driving a screw rod by supersonic vibration, comprising:
   a screw rod provided with a groove portion formed helically along an axial direction thereof;
   a pair of stands rotatably holding opposite ends of said screw rod;
   a work rack partially surrounding said screw rod and slidable in the axial direction of said screw rod;
   at least one first screw rod rotation device secured on one side of said work rack and extending from said work rack to said screw rod, said at least one first screw rod rotation device comprising a first vibrator contacting with said groove portion of said screw rod at a first specific angle, a first spring urging said first vibrator toward said groove portion of said screw rod at a specific pressure and a first piezoelectric actuator for vibrating said first vibrator upon electrical activation to rotate said screw rod in a first rotational direction; and
   at least one second screw rod rotation device secured on another side of said work rack and extending from said work rack to said screw rod, said at least one second screw rod rotation device comprising a second vibrator contacting with said groove portion of said screw rod at a second specific angle opposite said first specific angle, a second spring urging said second vibrator toward said groove portion of said screw rod at a specific pressure and a second piezoelectric actuator for vibrating said second vibrator upon electrical activation to rotate said screw rod in a second direction.

2. A mechanism for driving a screw rod by supersonic vibration, as claimed in claim 1, wherein:
   when one of said first and second piezoelectric actuators is electrically activated, a very small amount of electric current is supplied to the other of said first and second piezoelectric actuators.

3. A mechanism for driving a screw rod by supersonic vibration, as claimed in claim 1, wherein:
   each of said first and second vibrators is wedge-shaped and has a front end slanted so as to contact a bottom of a valley of said groove portion of said screw rod.

4. A mechanism for driving a screw rod by supersonic vibration, as claimed in claim 2, wherein:
   each of said first and second vibrators is wedge-shaped and has a front end slanted so as to contact a bottom of a valley of said groove portion of said screw rod.

5. A mechanism for driving a screw rod by supersonic vibration, as claimed in claim 1, further comprising rails extending parallel to said screw rod, said rails holding said work rack slidably.

6. A mechanism for driving a screw rod by supersonic vibration, as claimed in claim 2, further comprising rails extending parallel to said screw rod, said rails holding said work rack slidably.

7. A mechanism for driving a screw rod by supersonic vibration, as claimed in claim 3, further comprising rails extending parallel to said screw rod, said rails holding said work rack slidably.

8. A mechanism for driving a screw rod by supersonic vibration, as claimed in claim 4, further comprising rails extending parallel to said screw rod, said rails holding said work rack slidably.

* * * * *